(12) United States Patent
ten Brink et al.

(10) Patent No.: US 7,535,975 B1
(45) Date of Patent: May 19, 2009

(54) QAM MAPPING AND BIT LABELING OR BIT-INTERLEAVED CODED MODULATION

(75) Inventors: Stephen ten Brink, Irvine, CA (US); Ravishankar Mahadevappa, Irvine, CA (US)

(73) Assignee: Wionics Technologies, Inc., Irvine, CA (US)

( * ) Notice: Subject to any disclaimer, the term of this patent is extended or adjusted under 35 U.S.C. 154(b) by 726 days.

(21) Appl. No.: 10/984,358

(22) Filed: Nov. 8, 2004

Related U.S. Application Data

(60) Provisional application No. 60/518,350, filed on Nov. 7, 2003.

(51) Int. Cl.
H04L 27/36 (2006.01)

(52) U.S. Cl. .................. 375/298; 375/260; 375/261; 375/268; 370/210

(58) Field of Classification Search ............... 375/298, 375/261
See application file for complete search history.

(56) References Cited

U.S. PATENT DOCUMENTS 5,493,586 A * 2/1996 Brownlie et al. ............ 375/265

6,449,246 B1 * 9/2002 Barton et al. ............... 370/210

OTHER PUBLICATIONS

Bellorado, et al., "Approaching The Capacity Of The MIMO Rayleigh Flat-Fading Channel W/QAM Constellations, Independent Across Antennas And Dimensions", ISIT, Yokohama, Japan, Jun. 29-Jul. 4, 2003 (1 pg.).

Demjanenko, et al., "Reasons-To-Use-Non-Squared-Qam-Constellation-With-Independent-I&Q-In-Pan-Systems", IEEE P802.15, Wireless Personal Area Networks, IEEE P802.15-15-03-0311-00-003a, Jul. 2003, pp. 1-11.

Torres, J., "Method For Using Non-Squared QAM Constellations", IEEE 802.16 Broadband Wireless Access Working Group <http://ieee802.org/16>, IEEE C802.16a-02/66, May 23, 2002, pp. 0-12.

Wesel, R., "New Coding Techniques For Multicarrier Modulation", Final Report 1997-1998 for MICRO Project 97-204, pp. 1-4.

Wesel, et al., "Constellation Labeling For Linear Encoders", IEEE Transactions On Information Theory, vol. 47, No. 6, Sep. 2001, pp. 2417-2431.

* cited by examiner

*Primary Examiner*—Shuwang Liu
*Assistant Examiner*—Lihong Yu
(74) *Attorney, Agent, or Firm*—Tyrban LLC; Thaddeus Gabara

(57) ABSTRACT

Methods and systems using a Gray-like labeled QAM cross-constellation are disclosed. In some embodiments a Gray-like labeled QAM cross-constellation is used in wireless communication systems.

27 Claims, 12 Drawing Sheets

QAM MAPPING AND BIT LABELING OR BIT-INTERLEAVED CODED MODULATION

CROSS REFERENCE TO RELATED APPLICATION

This application claims the benefit of U.S. Provisional Application No. 60/518,350, filed Nov. 7, 2003 which is hereby incorporated by reference as if set forth in full herein.

BACKGROUND OF THE INVENTION

The present invention relates generally to quadrature amplitude modulation (QAM), and more specifically to communications using a cross-constellation QAM code.

QAM signaling is often used for communications between devices. QAM signaling provides efficient use of available bandwidth by mapping symbols, generally comprising a number of bits, into phase and amplitude modulated signals.

A commonly used QAM mapping scheme for wireless communication channels uses a 64QAM Gray-labeled constellation. In a 64QAM constellation symbols of six bits, or 64 possible values, are mapped to positions representing a combination of eight possible amplitudes and eight possible phase shifts. For a Gray labeled constellation adjacent positions differ by one bit. Gray labeling provides for reduced data loss arising from corruption of information during transmission, as the most likely errors are slight pertubations in phase or amplitude. In addition, Gray labeling is often done in such a way that bits making up a symbol are separated into in-phase component bits and quadrature component bits, allowing for increased ease of demapping. A 64QAM Gray-labeled constellation thereby provides for efficient transmission of data while allowing for robust communications.

Increasing the amount of information contained in transmitted symbols provides a convenient method of increasing the data rate of a communication channel. For example, use of a 128QAM or a 256QAM constellation would allow each transmitted symbol to represent 128 values in 7 bits or 256 values in 8 bits, respectively, as opposed to the mere 64 values in 6 bits provided by a 64QAM constellation. However, use of a 256QAM constellation may require, for example, the use of 16 possible amplitudes and 16 possible phase offsets. Such a requirement may overly tax the ability of a reception system to differentiate received signals in view of various considerations such as channel noise, device capabilities and other factors. Use of a 128QAM constellation may avoid some of these difficulties while still providing an increased data rate. Unfortunately, Gray labeling of a constellation, and the increased ability to recover received data, is generally only available for constellations providing $2^{2n}$ values, that is square constellations.

BRIEF SUMMARY OF THE INVENTION

The present invention provides a Gray-like labeled non-$2^{2n}$ constellation and methods and systems using a Gray-like labeled non-$2^{2n}$ constellation. In some aspects the invention provides a cross constellation formed by mirroring symbols of segments of a Gray labeled constellation and modifying a bit of the mirrored symbols. In other aspects the invention provides a cross constellation formed by reflecting portions of a Gray labeled constellation and inverting a bit of symbols of the reflected portions. In other aspects the invention provides a method of forming a Gray-like labeled constellation.

In some aspects the invention provides a method and system of communicating using a Gray-like labeled non-$2^{2n}$ constellation. In other aspects the invention provides a bit interleaved coded modulation wireless transmitter using a Gray-like labeled constellation. In other aspects the invention provides a receiver using a Gray-like labeled constellation.

In some aspects the invention provides a method, using an electronic system, of processing a signal, comprising determining a correlation between a labeled coordinate pair in a complex plane corresponding to an m-bit symbol, where m is 2*22n, n any integer, each label for each labeled coordinate pair comprising a different m-bit symbol, the labeled coordinate pairs representing a cross-constellation having a 22n Gray labeled constellation centered on an origin of the complex plane and four sets of labeled coordinate pairs each having (22n)/4 labeled coordinate pairs about sides of the 22n Gray labeled constellation, at least some of the four sets of labeled coordinate pairs having labels representing a reflection with a one bit difference of the 2**2n Gray labeled constellation up to a depth equal to a depth of the at least some of the four sets.

In some aspects the invention provides a transmission system comprising a source providing information in digital form; a QAM modulator receiving the information in digital form and processing the information to form an analog signal stream in accordance with a Gray-like labeled cross constellation, the Gray-like labeled cross constellation comprising bit labeled coordinate pairs in a plane formed by an I-axis and a Q-axis, the bit labeled coordinate pairs forming a square base portion centered about an origin of the plane, the base portion forming a constellation with adjacent bit labels differing by one bit, the bit labeled coordinate pairs also forming flaps about edges of the base portion, with at least half of the flaps including bit labels differing by one bit from adjacent bit labels within the flaps and adjacent bit labels within the base.

In some aspects the invention provides a receiving system comprising a QAM demodulator receiving information in analog form and processing the information to form an digital signal stream in accordance with a Gray-like labeled cross constellation, the Gray-like labeled cross constellation comprising bit labeled coordinate pairs in a plane formed by an I-axis and a Q-axis, the bit labeled coordinate pairs forming a square base portion centered about an origin of the plane, the base portion forming a constellation with adjacent bit labels differing by one bit, the bit labeled coordinate pairs also forming flaps about edges of the base portion, with at least half of the flaps including bit labels differing by one bit from adjacent bit labels within the flaps and adjacent bit labels within the base.

In some aspects the invention provides a method used in communication of digital information in analog form using a labeled non-22n constellation, comprising mapping information to a coordinate having a digital label of a non-22n constellation comprising a 22n constellation, and portions extending from the 22n constellation, at least some of the portions extending from the 22n constellation being a reflection of part of the 22n constellation with a one bit difference.

In some aspects the invention provides a method, in a communication system, of processing digital symbols using a labeled non-22n constellation, comprising correlating a digital symbol with an analog signal having an amplitude and a phase, the amplitude and the phase specifying a coordinate in a complex plane, the coordinate being labeled in accordance with a non-22n constellation, the non-22n constellation having a base portion comprising a 22n constellation having 22n different combinations of amplitudes and phases, each combination corresponding to a different digital symbol of length 2n, the non-22n constellation having at least some additional portions having a different combination of amplitudes and phases with each combination corresponding to a different digital symbol of length greater than 2n, with each different digital symbol differing from a digital symbol corresponding to the base portion by one bit.

These and other aspects of the invention are more fully comprehended in light of the following discussion and accompanying figures.

DETAILED DESCRIPTION

Figure 1:
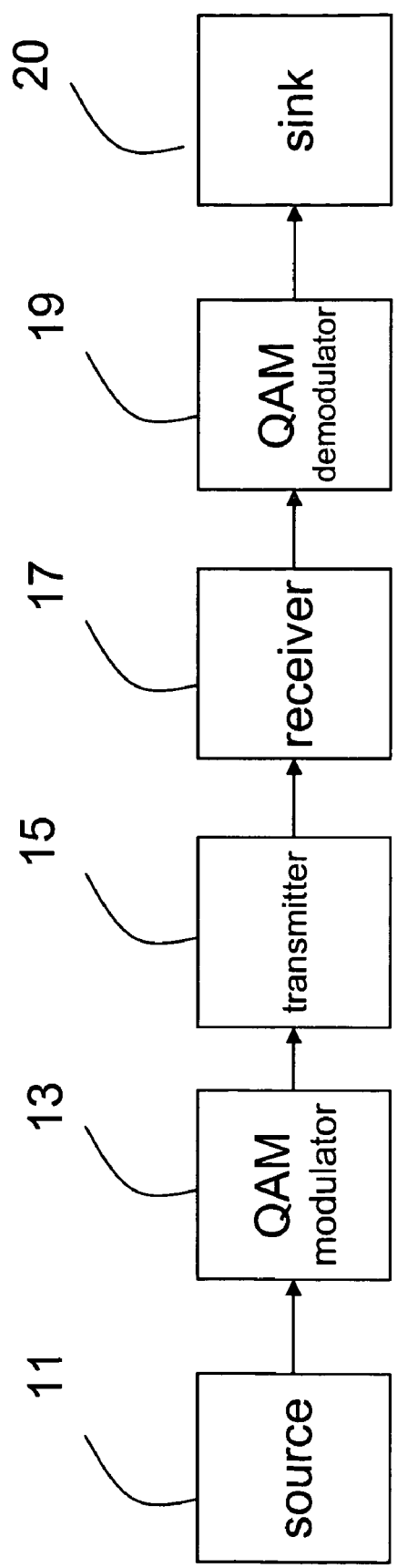
FIG. 1 is a block diagram of a communication system in accordance with aspects of the invention.

FIG. 1 illustrates a transmission system in accordance with aspects of the invention. In FIG. 1 a source 11 provides a data stream. The source may be a computer system, a personal digital device, or other digital device or subsystem of such a device. The source provides information in digital form to a QAM modulator 13. The QAM modulator receives the information in digital form and processes the information to form an analog signal stream using, for example, a Gray-like labeled cross constellation. In some embodiments the QAM modulator includes a QAM mapper, an inverse Fast Fourier Transform (iFFT) block, various interpolators, filters, and limiters, and a digital to analog converter. In other embodiments some of these items may not be included, or considered as included in other blocks or components. The QAM modulator provides the analog signal stream to a transmitter 15.

The transmitter transmits information in the analog signal stream, for example using radio frequency signals. A receiver 17 receives the transmitted information and provides the information to a QAM demodulator 19. The QAM demodulator receives the information and processes the information to form digital information, using, for example, a Gray-like labeled cross constellation. In some embodiments the QAM demodulator includes an analog to digital converter, a Fast Fourier Transform (FFT) block, various blocks and circuits to filter, synchronize, and otherwise process signals, and a QAM demapper. The QAM demodulator 19 provides the digital information to a data sink 20.

Figure 2:
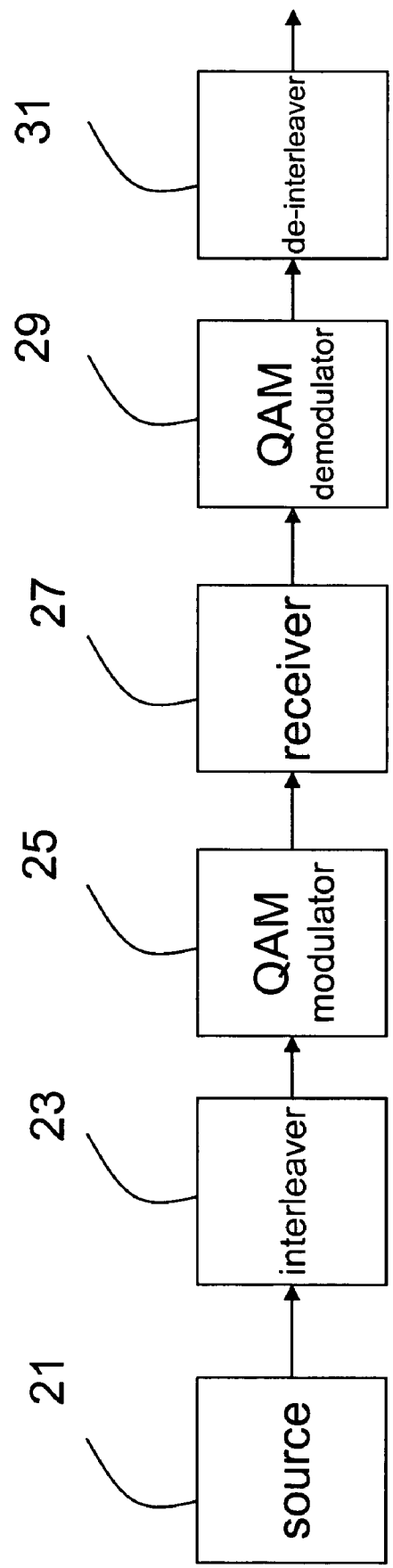
FIG. 2 is a block diagram of a further communication system in accordance with aspects of the invention.

In another embodiment, and as illustrated in FIG. 2, a bit interleaver 23 may be interposed between a source 21 and a QAM modulator 25. The bit interleaver may, for example, interleave bits from adjacent bytes or words so that information provided to the QAM modulator is arranged to allow the QAM modulator to form symbols made up of bits from different bytes or words. Similarly, on a receiving side a bit de-interleaver 31 is placed after a QAM demodulator to de-interleave the recovered symbols. Bit interleaving provides various benefits, including reduction in negative effects provided by burst errors in received information.

Figure 3:
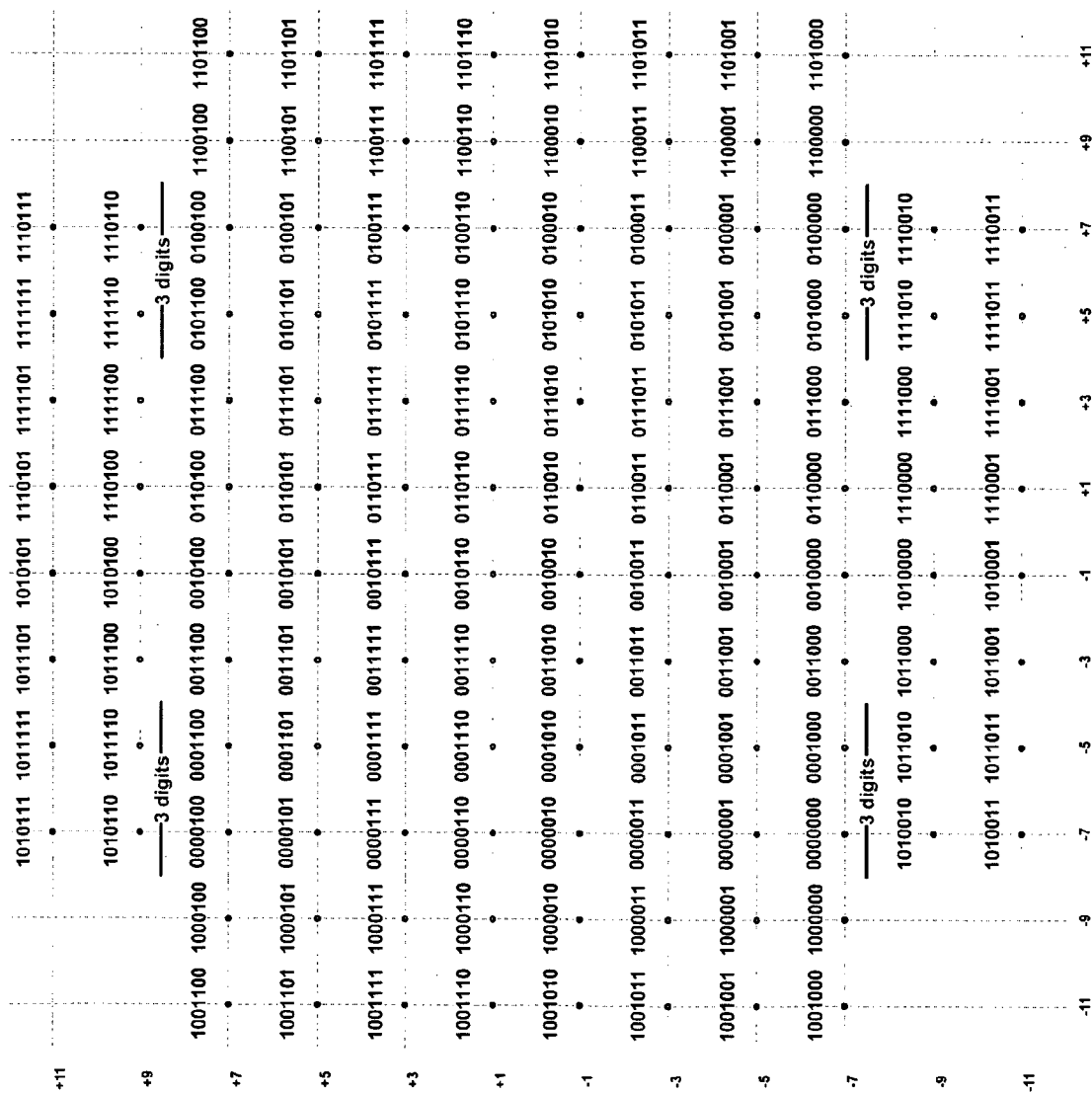
FIG. 3 is a Gray-like 128QAM cross constellation in accordance with aspects of the invention.
Figure 4:
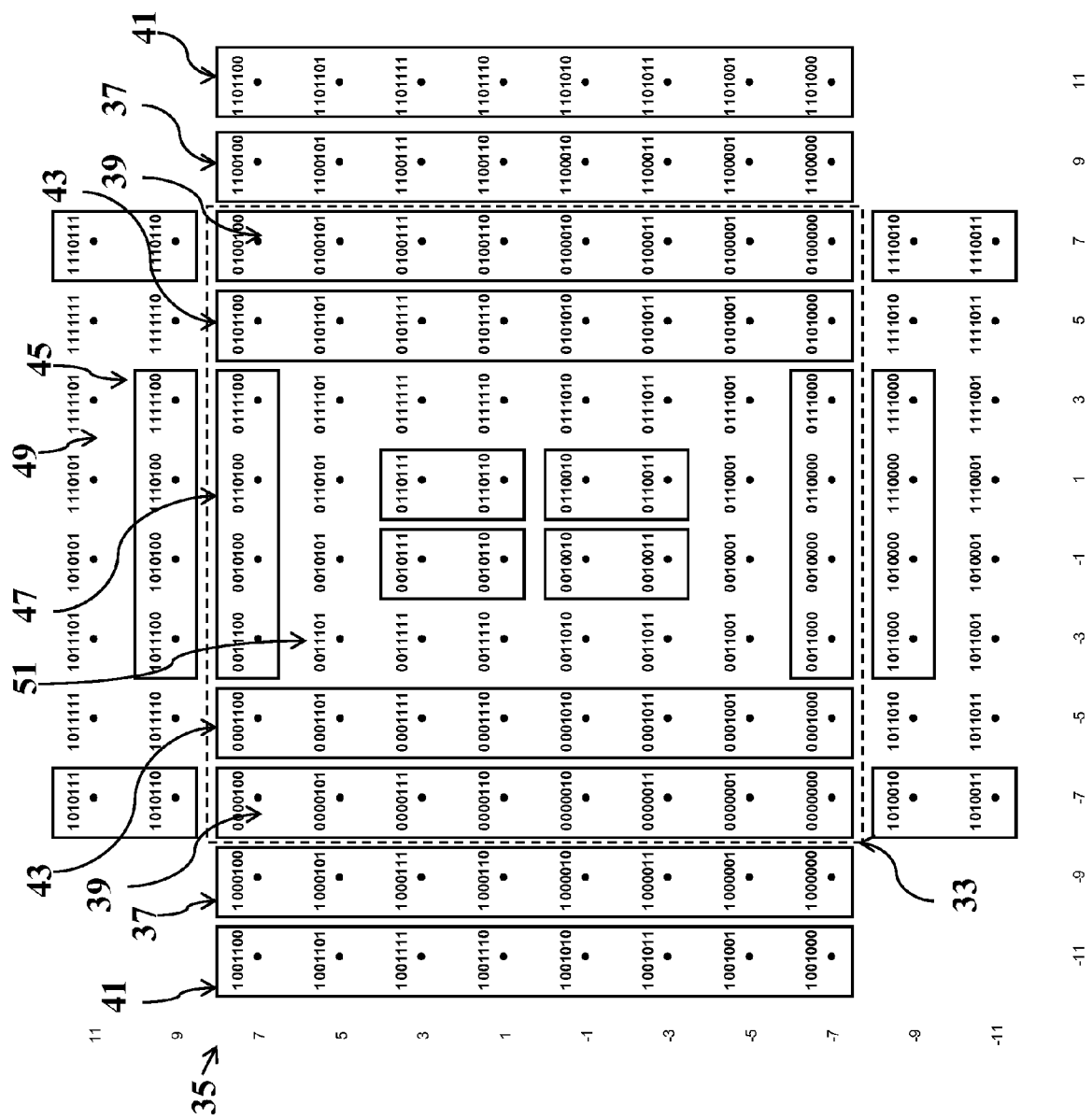
FIG. 4 is a further illustration of the constellation of FIG. 3.

In some embodiments the Gray-like labeled cross constellation utilized or referenced by the QAM modulators and QAM demodulators of FIGS. 1 and 2 is the constellation of FIG. 3. The constellation of FIG. 3 is arranged on a two dimensional plane formed by I and Q axis, with the I-direction and the Q-direction corresponding to the x-direction and the y-direction of a Cartesian coordinate system. As shown in FIG. 4, which is FIG. 3 with descriptive markings, a square 8×8 base 33 is centered about the origin. Each coordinate is indicated by a symbol, and the symbols of the base form a 64QAM Gray code constellation with the most significant bit (MSB) set to zero.

Flaps 35 extend from the edges of the 64QAM Gray code constellation. Each flap provides coordinates for 16 symbols. Flaps on either side of the 64QAM Gray code constellation provide coordinates in 2×8 flaps. Flaps above and below the 64QAM Gray code constellation provide coordinates in 8×2 flaps. As with the base, each coordinate is indicated by a symbol. Unlike the base, however, the MSB is set to one. The base and flaps together provide a 128QAM cross constellation.

As illustrated in FIGS. 3 and 4, the symbols of the flaps on either side of the 64QAM Gray code constellation are determined by reflecting and modifying symbols along the adjacent sides of the 64QAM Gray code constellation. Thus, coordinate labels for a first column 37 adjacent the square constellation are formed by copying the symbols in the column 39 along the edge of the square constellation, and inverting the most significant bit of the copied symbols. Coordinate labels for a second column 41 adjacent the first column are formed by copying the symbols in the column 43 interior of the column along the edge of the square, and inverting the most significant bit of the copied symbols.

Accordingly, bit labelings are determined for the columns of the side flaps by reflecting an equal number of columns of the square constellation, and inverting the most significant bit of the newly formed columns. As the symbols of the columns of the square constellation each have a distance d=1 from adjacent symbols, and the newly formed columns have the same bit inverted, the symbols of the newly formed columns each have a distance d=1 from adjacent symbols. In addition, as the newly formed column adjacent the edge of the square constellation is a reflection of the edge column of the square constellation, with one bit of each symbol inverted, the symbols of the newly formed column adjacent the edge also has a distance d=1 from adjacent symbols of the square constellation.

Coordinate labeling for interiors of rows forming the top flap and bottom flap of the cross constellation of FIG. 3 are determined in a similar manner. For the top flap, coordinate labels for an interior section 45 of a first row of symbols along the top edge of the square constellation are determined by copying symbols from an interior section of the top row 47 of the square constellation, and inverting the most significant bit. Coordinate labels for an interior section of a second row 49 of symbols adjacent the first row of symbols are determined by copying symbols from an interior section 51 of the next row within the square constellation, and inverting the most significant bit. The symbols of the interior sections of the rows of the top flap, as with the side flaps previously discussed, have a distance d=1 from adjacent symbols.

Coordinate labels for interiors of rows forming the bottom flap are determined in a similar manner, using symbols of the bottom two rows of the square constellation. The symbols of the interior sections of the rows of the bottom flaps therefore also have a distance d=1 from adjacent symbols.

Coordinate labels for exterior portions of the rows of the top flap and bottom flap are formed using symbols of the interior of the square constellation. The exterior portions of the rows of the top flap and bottom flap form four separate equal sized portions. For the 128QAM constellation of FIG. 3, each of the portions has four labeled coordinates. The interior of the square constellation may also be divided into four portions, with each portion also having four labeled coordinates. The four portions of in the interior of the square constellation are each mapped to one of the exterior portions, based on distance, and the most significant bit of the mapped symbols is inverted.

Figure 8:
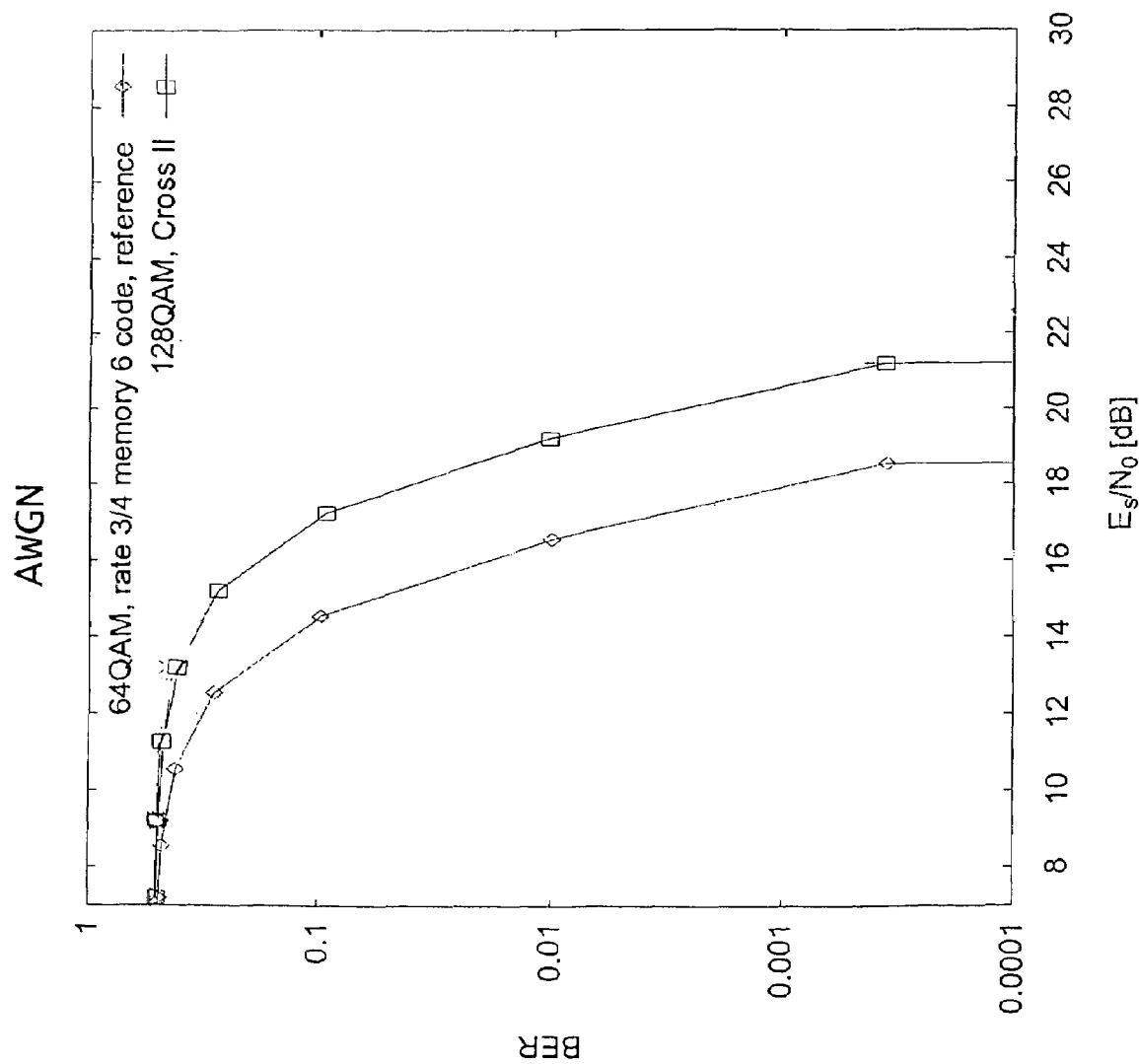
FIGS. 8 and 9 are BER charts for the constellation of FIG. 3.
Figure 9:
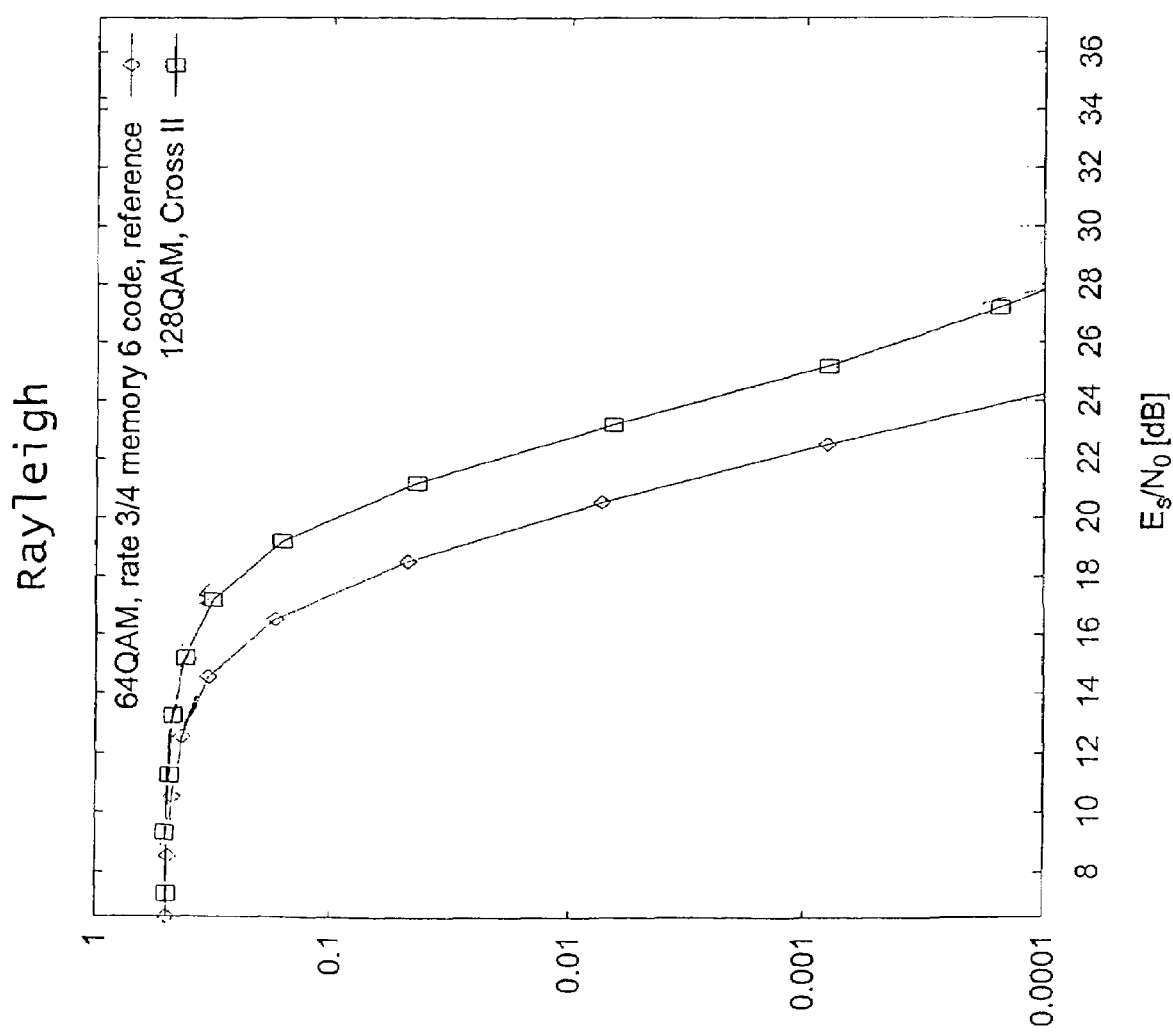

Accordingly, the resulting 128QAM cross constellation has coordinate labelings such that the distance d between adjacent symbols is 1, except for eight pairs of symbols whose distance d is 3. Simulation results indicating bit error rates (BER) for different conditions are provided FIGS. 8 and 9.

Figure 5:
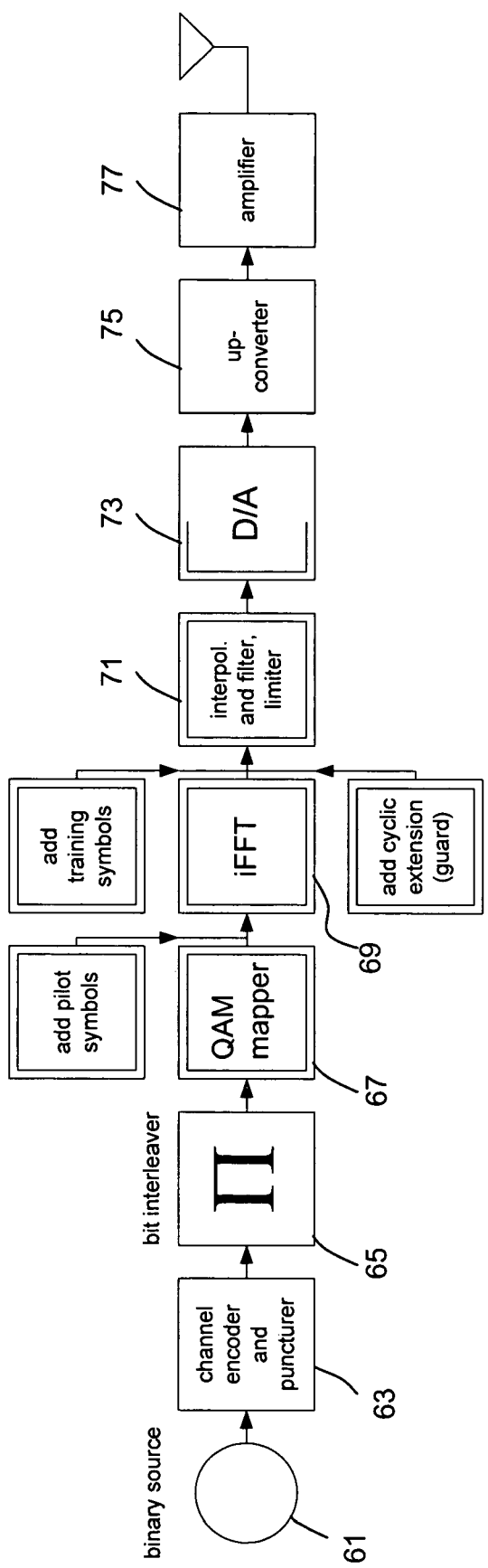
FIG. 5 is a block diagram of a wireless transmission system in accordance with aspects of the invention.

FIG. 5 is a block diagram of a transmitter in accordance with aspects of the invention. The transmitter is a bit interleaved coded modulation wireless transmitter, transmitting RF channel encoded interleaved QAM signals. The transmitter receives digital information from a source 61. A channel encoder 63 encodes the digital information for error correction purposes. In various embodiments the channel encoder may encode the information using a Reed-Solomon code, a BCH code, turbo-coding, an LDPC code, or various other forward error correction codes and coding techniques. Preferably, the channel encoder encodes the information using an error correcting code suitable for the particular communication channel used.

The encoded information is received by a bit interleaver 65. The bit interleaver interleaves bits from different bytes, words, or parallel signal streams. Bit interleaving is useful, for example, in ameliorating the effects of burst errors during transmission. The bit interleaved information is received by a QAM mapper 67, which forms the bit interleaved information into symbols and maps the symbols according to a Gray-like cross constellation, for example the Gray-like cross constellation of FIG. 3. An inverse Fast Fourier Transform (iFFT) block 69 receives the mapping, along with pilot symbols generated by a pilot symbol generator. The iFFT block switches the received information to the time domain. The time domain information is interpolated, filtered and limited in a filtering block 71, and then converted to an analog signal using a digital to analog converter 73. The analog signal is upconverted to a transmission frequency using an upconverter 75, amplified by an amplifier 77, and transmitted.

Figure 6:
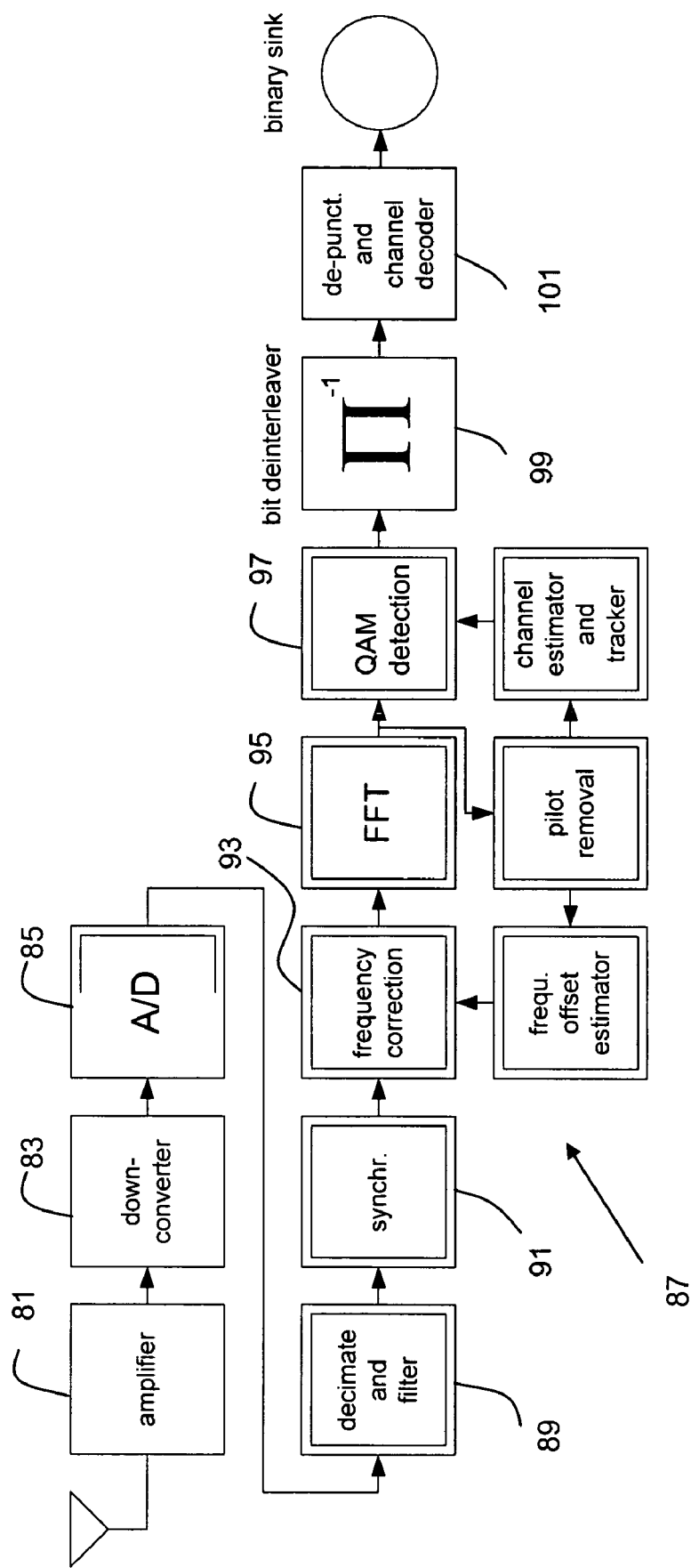
FIG. 6 is a block diagram of a wireless reception system in accordance with aspects of the invention.

FIG. 6 is a block diagram of a receiver in accordance with aspects of the invention. The receiver receives a transmitted signal, amplifies the received signal with an amplifier 81, down-converts the amplified signal with down-conversions circuitry 83, and forms a digital signal by passing the amplified down-converted signal through an analog to digital converter 85. The digital information is processed by various circuitry 87 common to wireless receivers, such as a decimate and filter block 89, a synchronization block 91, and a frequency correction block 93. The processed information is provided to a Fast Fourier Transform (FFT) block 95, which switches the information to the frequency domain. The frequency domain information is provided to a QAM detection block 97, which demaps the received signals to symbols as represented by a Gray-like cross constellation, for example the constellation as in FIG. 3. The symbols formed by the QAM detection block are bit deinterleaved by a bit deinterleaver 99 and provided to a channel decoder 101, which recovers transmitted information using FEC techniques and passes the recovered information to a binary sink.

In some configurations the transmitter of FIG. 5 and the receiver of FIG. 6 are configured for both 128QAM signaling and 64QAM signaling, using for example a 64QAM Gray-labeled constellation and the constellation of FIG. 3. In such configurations common QAM mapper and QAM demapper circuits or blocks may be used for both the 64QAM processing and 128QAM processing.

Figure 7:
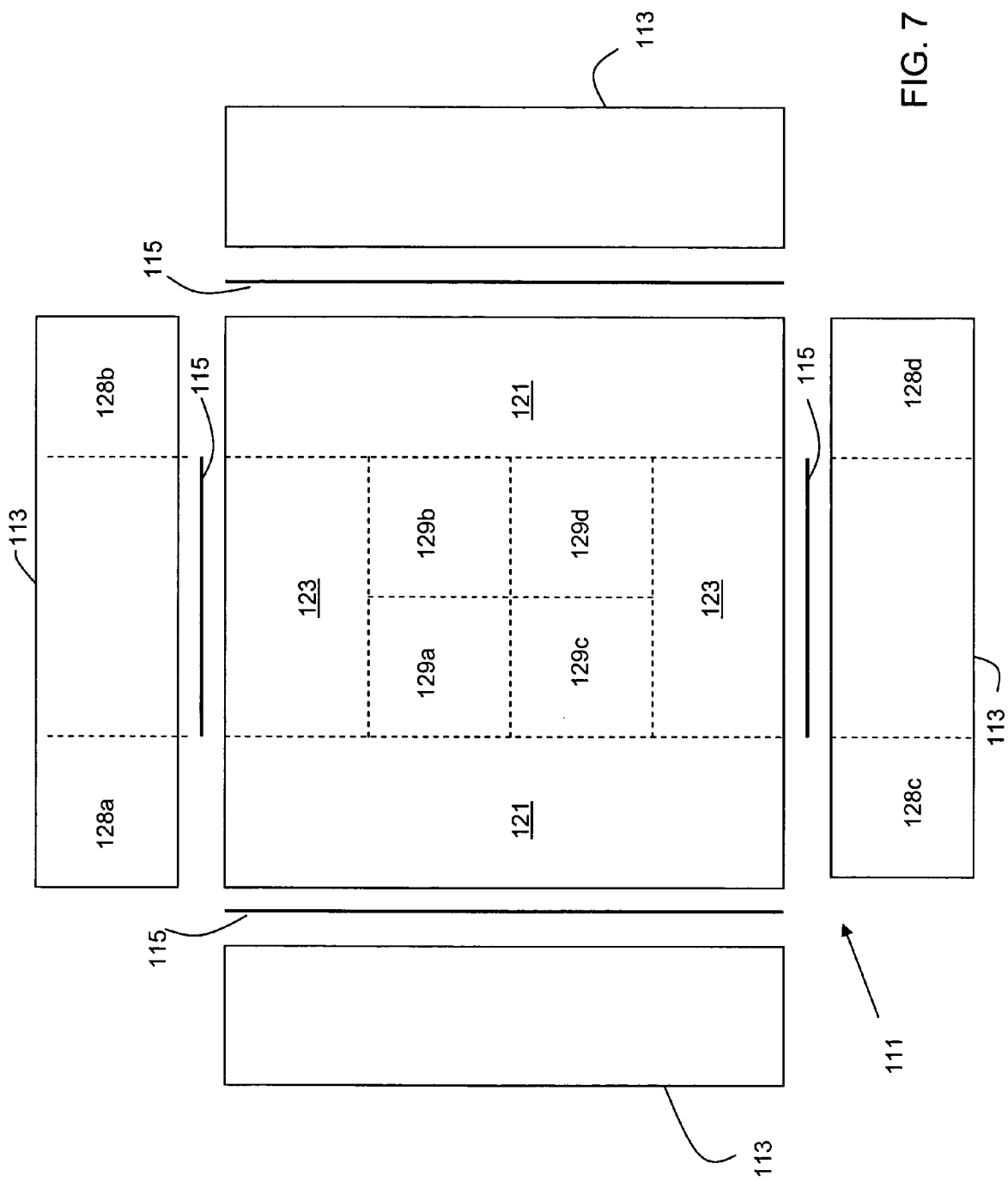
FIG. 7 illustrates formation of a Gray-like cross constellation in accordance with aspects of the invention.

FIG. 7 illustrates formation of a Gray-like labeled cross constellation. In FIG. 7, a square base 111 provides a Gray code $2^{2n}$ labeling scheme. Outlying sides 113 of the cross constellation flank the sides of the square base. Reflection, or mirroring, indicators 115 are shown for descriptive purposes alongside sides of the square base. The reflection indicators are between the outlying sides and the square base. A pair of reflection indicators extend alongside opposing sides of the square base for the full length of the sides. The reflection indicators alongside the remaining two sides of the square base extend alongside interior portions of the sides.

Each of the reflection indicators indicates reflection of a portion of the square base into the outlying sides. The depth of the reflected portion is equal to the depth of the outlying sides. The reflection indicators also indicate inversion of a selected common bit. In some embodiments the inversion is of the MSB of reflected symbols, although in some embodiments the inversion is of the LSB or some other bit.

The pair of opposing full length reflectors indicate reflection of an entire side 121 of the square base constellation. The shorter reflection indicators along the remaining sides indicate reflection of only the interior portions 123 of those sides, as symbols along the exterior portions of the sides are subject to reflection as indicated by the full length reflectors. Remaining portions 128a-d of outlying sides receiving less than full length reflection are filled with unreflected symbols 129a-d from the interior of the square base, with inversion of the selected common bit and arrangement to minimize average distance of the constellation.

Figure 10:
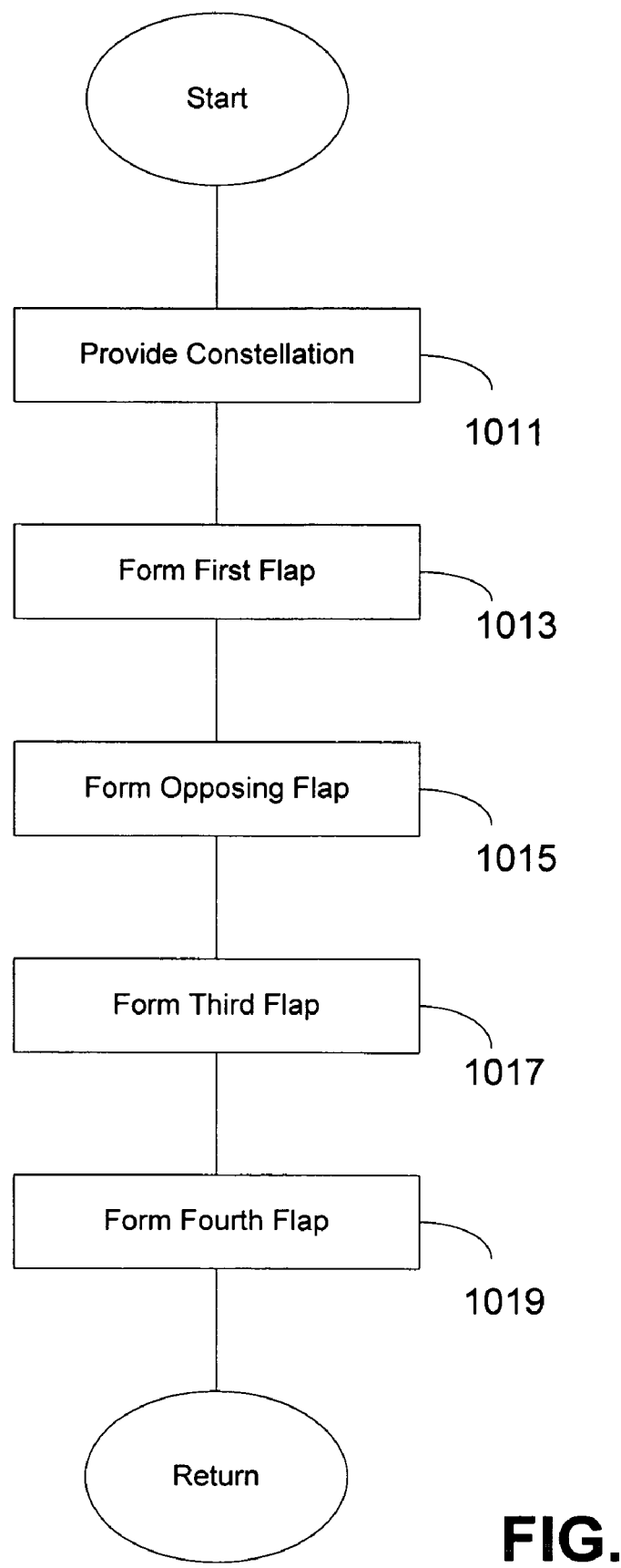
FIG. 10 is a flow diagram of a process of forming a cross constellation in accordance with aspects of the invention.

FIG. 10 is a flow diagram of a process for determining bit labels of a $2*2^{2n}$ cross constellation, for example such as the cross constellation of FIG. 7. A $2^{2n}$ square constellation in an I-Q plane is provided in block 1011. In many embodiments the $2^{2n}$ square constellation is a Gray labeled constellation, which may be referred to as a Gray code constellation. In a Gray labeled constellation bit labels for adjacent coordinates differ by one bit. In Block 1013 bit labels are defined for coordinates in a first flap of the cross constellation, with the first flap an arm of the cross constellation in some embodiments. The first flap is located approximate an edge of the $2^{2n}$ square constellation. The first flap has bit labels which differ from bit labels for adjacent coordinates, both within the flap and the $2^{2n}$ square constellation. In Block 1015 bit labels are defined for coordinates in a second flap of the cross constellation, with the second flap on an opposite edge of the $2^{2n}$ square constellation from the first flap. The second flap also has bit labels which differ from bit labels for adjacent coordinates, both within the flap and the $2^{2n}$ square constellation.

In Block 1017 bit labels are defined for coordinates in a third flap of the cross constellation. In Block 1019 bit labels are defined for coordinates in a fourth flap of the cross constellation, with the fourth flap on an opposite edge of the $2^{2n}$ square constellation from the third flap. The process then returns.

Figure 11:
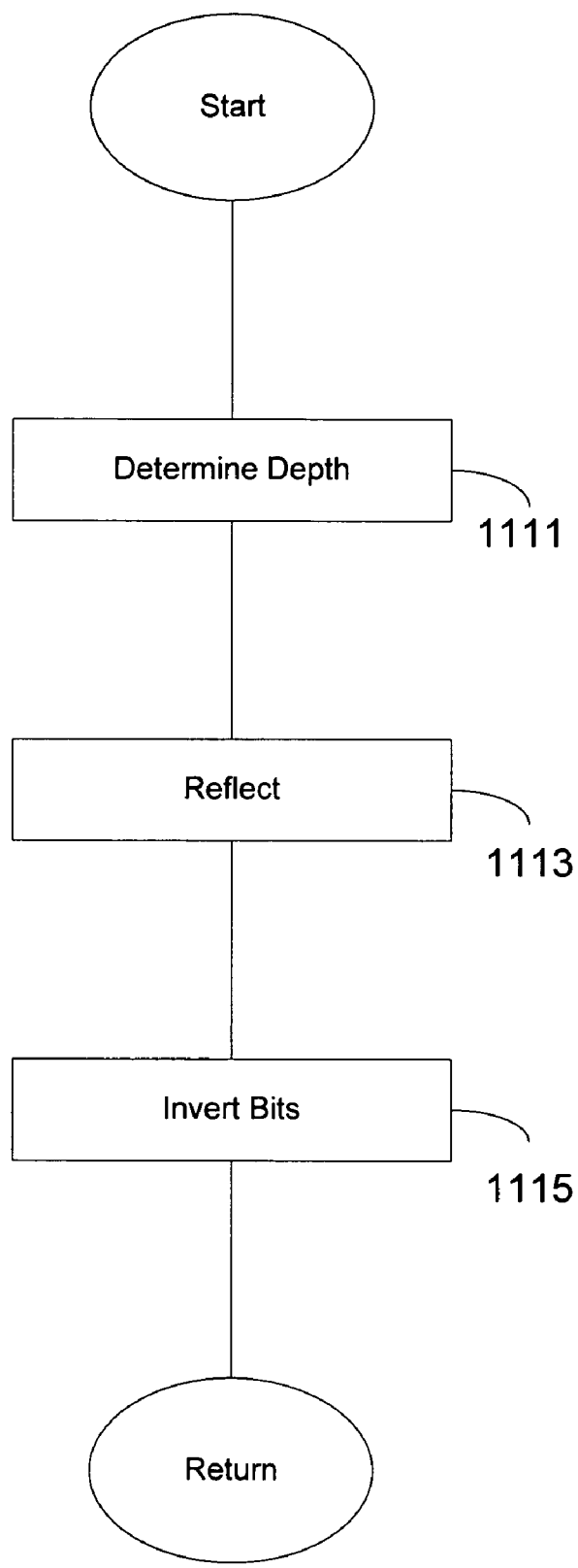
FIG. 11 is a flow diagram of a process of determining bit labels for a portion of a cross constellation in accordance with aspects of the invention.

FIG. 11 is a flow diagram of a process for determining bit labels for coordinates in a flap of a $2*2^{2n}$ cross constellation, for example for the first flap and the second flap of the constellation formed as a result of the process of FIG. 10. In Block 1111 a depth of the flap is determined. The depth is determined to allow for a number of coordinate pairs sufficient to form the cross constellation, taking into consideration the number of total flaps. For a $2*2^{2n}$ cross constellation based on a $2^{2n}$ square constellation the depth is two. In block 1113 provisional bit labels for the flap are defined by reflecting the bit labels along an edge of the $2^{2n}$ cross constellation about the flap to the depth of the flap. For example, provisional bit labels for coordinates in the flap adjacent to the square constellation are the same as bit labels for coordinates within the square constellation adjacent the flap. Similarly, provisional bit labels for coordinates in the flap once removed from the edge of the square constellation are the same as bit labels for coordinates with the square constellation once removed from the flap. In Block 1115 final bit labels are formed by inverting a bit in each of the provisional bit labels is inverted. In many embodiments the inverted bit is the most significant bit of the provisional bit labels. In some embodiments the inverted bit is the least significant bit of the provisional bit labels. Additionally, in some embodiments the process does not explicitly form provisional bit labels, effectively combining operations of Blocks 1113 and 1115 in a single step. The process then returns.

Figure 12:
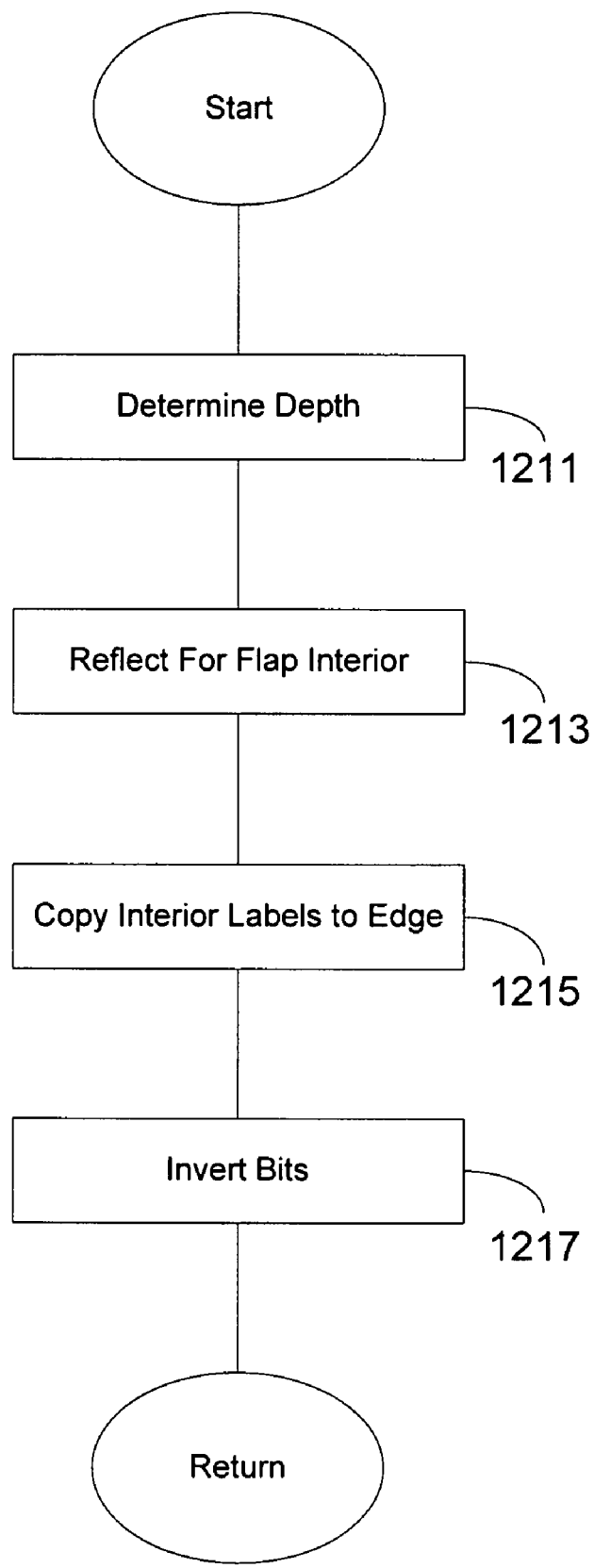
FIG. 12 is a further flow diagram of a process of determining bit labels for a portion of a cross constellation in accordance with aspects of the invention.

FIG. 12 is a flow diagram of a further process for determining bit labels for coordinates in a flap of a $2*2^{2n}$ cross constellation, for example for the third flap and the fourth flap of the constellation formed as a result of the process of FIG. 10. In block 1211 a depth of the flap is determined. In some embodiments the depth of the flap may be previously determined. In other embodiments the depth of the flap is determined as in the process of FIG. 11. In Block 1213 provisional bit labels for interior coordinates of the flap are determined. The provisional bit labels for interior coordinates of the flap are determined by reflecting bit labels in the square constellation, as in the process of FIG. 11. The interior coordinates of the flap are, in many embodiments, those coordinates in the flap which may be formed by reflecting bit labels of the square constellation which are not reflected when the process of FIG. 11 is used to form a flap of an adjacent edge of the square constellation.

In Block 1215 provisional bit labels for exterior coordinates of the flap are determined. The exterior coordinates of the flap are those coordinates which are not interior coordinates of the flap. The provisional bit labels are formed by copying bit labels from portions of the interior of the square constellation. Uncopied bit labels from portion of the interior of the square constellation are copied if provisional bit labels for flap coordinates have already been formed using bit labels from the interior of the square constellation. In Block 1217 final bit labels for coordinates in the flap are formed by inverting a bit of the provisional bit labels. In some embodiments the operation of Block 1217 is combined as part of the operations of Blocks 1213 and 1215, and provisional bit labels are not explicitly formed. The process then returns.

The invention therefore provides a Gray-like labeled cross constellation and communication systems and methods using a Gray-like labeled cross constellation. Although the invention has been described with respect to certain embodiments, it should be recognized that the invention includes the claims and their equivalents supported by this disclosure.

The invention claimed is:

1. A method, using an electronic system, of processing a signal, comprising:
   determining a correlation between a labeled coordinate pair in a complex plane corresponding to an m-bit symbol, m=2n+1, n being any positive integer, where the total number of coordinate pairs is $2*22n$, each label for each labeled coordinate pair comprising a different m-bit symbol, the labeled coordinate pairs representing a cross-constellation having a $22n$ square Gray labeled constellation forms a first symbol set having a particular bit position set to a same digital value centered on an origin of the complex plane and four sets of labeled coordinate pairs form a second symbol set having the particular bit position set to the compliment digital value each having $(22n)/4$ labeled coordinate pairs about sides of the $22n$ Gray labeled constellation, at least some of the four sets of labeled coordinate pairs having labels representing a reflection with a one bit difference of the $2**2n$ Gray labeled constellation up to a depth equal to a depth of the at least some of the four sets.

2. The method of claim 1 wherein the particular bit position is in a most significant bit.

3. The method of claim 1 wherein the particular bit position is in a least significant bit.

4. The method of claim 1 wherein the $2**2n$ Gray labeled constellation is a 64QAM Gray code constellation and the cross constellation is a 128QAM constellation.

5. The method of claim 4 wherein the 64QAM Gray code constellation is a 64QAM Gray code constellation with the same digital value set to 0.

6. The method of claim 5 wherein each of the four sets form a flap extending from a different edge of the 64QAM constellation.

7. The method of claim 6 wherein flaps on either side of the 64QAM Gray code constellation provide coordinates in 2×8 flaps and flaps above and below the 64QAM Gray code constellation provide coordinates in 8×2 flaps.

8. The method of claim 7 wherein the compliment digital value is set to 1.

9. The method of claim 8 wherein the flaps on either side of the 64QAM Gray code constellation form side flaps.

10. The method of claim 9 wherein the side flaps have columns which are a reflection of an equal number of columns of the 64 Gray code constellation about the side flaps with the most significant bit inverted.

11. The method of claim 10 where labels of coordinates in the side flaps have a distance d=1 from adjacent symbols.

12. A transmission system comprising:
   a source providing information in digital form;
   a QAM modulator receiving the information in digital form and processing the information to form an analog signal stream in accordance with a Gray-like labeled cross constellation, the Gray-like labeled cross constellation comprising:
   bit labeled coordinate pairs in a plane formed by an I-axis and a Q-axis,
   the bit labeled coordinate pairs having a particular bit position set to a same digital value forming a square base portion centered about an origin of the plane, the base portion forming a constellation with adjacent bit labels differing by one bit,
   the bit labeled coordinate pairs having the particular bit position set to the compliment digital value also forming flaps about edges of the base portion, with at least half of the flaps including bit labels differing by one bit from adjacent bit labels within the flaps and adjacent bit labels within the base.

13. The transmission system of claim 12 wherein the QAM modulator comprises a QAM mapper and inverse Fast Fourier transform (iFFT) circuitry.

14. The transmission system of claim 13 wherein the inverse iFFT circuitry comprises an iFFT block.

15. The transmission system of claim 14 wherein the QAM modulator further comprises an digital-to-analog converter.

16. The transmission system of claim 15 wherein the at least half of the flaps have bit labels which form a reflection of bit labels in square base portion, with one bit difference.

17. The transmission system of claim 16 wherein the particular bit position is in a most significant bit.

18. The transmission system of claim 16 wherein the particular bit position is in a least significant bit.

19. A receiving system comprising:
  a QAM demodulator receiving information in analog form and processing the information to form an digital signal stream in accordance with a Gray-like labeled cross constellation, the Gray-like labeled cross constellation, comprising:
  bit labeled coordinate pairs in a plane formed by an I-axis and a Q-axis,
  the bit labeled coordinate pairs having a particular bit position set to a same digital value forming a square base portion centered about an origin of the plane, the base portion forming a constellation with adjacent bit labels differing by one bit,
  the bit labeled coordinate pairs having the particular bit position set to the compliment digital also forming flaps about edges of the base portion,
  with at least half of the flaps including bit labels differing by one bit from adjacent bit labels within the flaps and adjacent bit labels within the base.

20. The receiving system of claim 19 wherein the QAM demodulator comprises Fast Fourier transform (FFT) circuitry and a QAM detector.

21. The receiving system of claim 20 wherein the FFT circuitry comprises an FFT block.

22. The receiving system of claim 21 wherein the QAM demodulator further comprises an analog-to-digital converter.

23. The receiving system of claim 22 wherein the at least half of the flaps have bit labels which form a reflection of bit labels in square base portion, with one bit difference.

24. The receiving system of claim 23 wherein the particular bit position is in a most significant bit.

25. The receiving system of claim 23 wherein the particular bit position is in a least significant bit.

26. A method used in communication of digital information in analog form using a labeled non-$2^{**}2n$ constellation, n being any positive integer comprising:
  mapping information to a coordinate having a digital label of a non-$2^{**}2n$ constellation comprising:
  a $2^{**}2n$ constellation forming a first symbol set having a particular bit position set to a same digital value, and
  portions extending from the $2^{}2n$ constellation forming a second symbol set having the particular bit position set to the compliment digital value, at least some of the portions extending from the $2^{}2n$ constellation being a reflection of part of the $2^{**}2n$ constellation with a one bit difference.

27. A method, in a communication system, of processing digital symbols using a labeled non-$2^{**}2n$ constellation, n being any positive integer comprising:
  correlating a digital symbol with an analog signal having an amplitude and a phase, the amplitude and the phase specifying a coordinate in a complex plane, the coordinate being labeled in accordance with a non-$2^{}2n$ constellation, the non-$2^{}2n$ constellation having a base portion comprising a $2^{}2n$ constellation having $2^{}2n$ different combinations of amplitudes and phases forming a first symbol set having a particular bit position set to a same digital value, each combination corresponding to a different digital symbol of length $2n$, the non-$2^{**}2n$ constellation having at least some additional portions having a different combination of amplitudes and phases forming a second symbol set having the particular bit position set to the compliment digital value with each combination corresponding to a different digital symbol of length greater than $2n$, with each different digital symbol differing from a digital symbol corresponding to the base portion by one bit.

* * * * *